Nov. 17, 1931.  P. FORKARDT  1,832,480
CHUCK
Filed Aug. 22, 1928  3 Sheets-Sheet 1
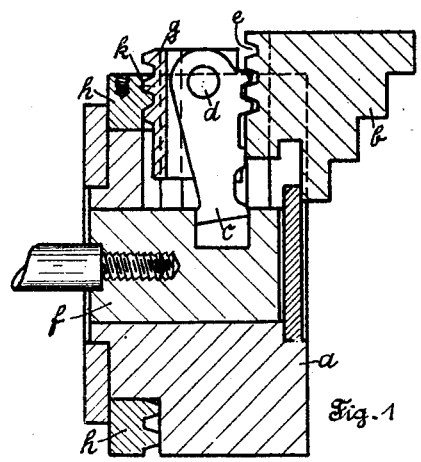
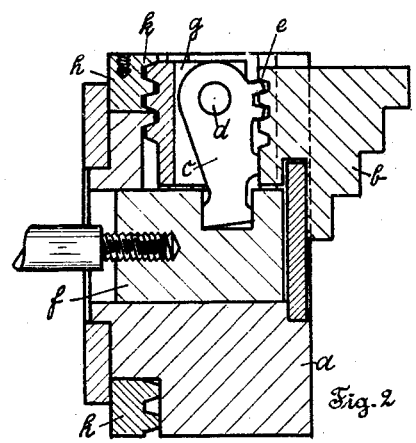
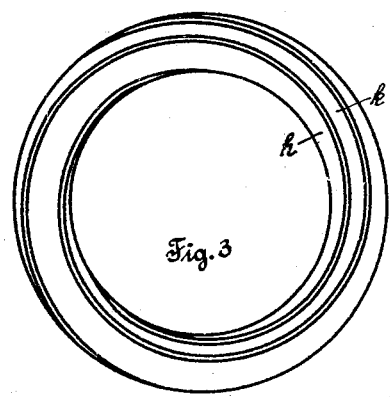
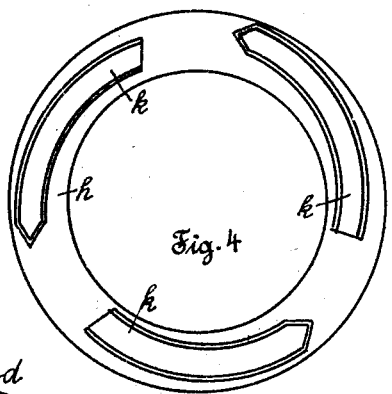
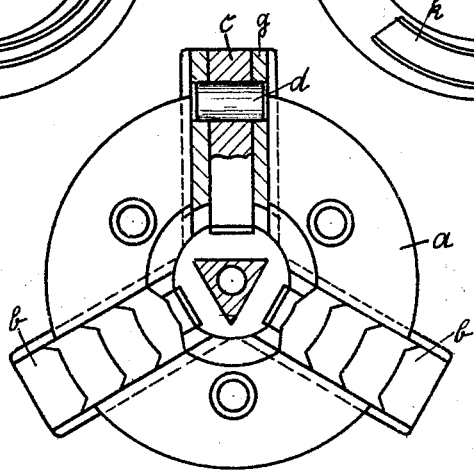
Inventor
Paul Forkardt
by
F. Sokal,
attorney.

Nov. 17, 1931.   P. FORKARDT   1,832,480
CHUCK
Filed Aug. 22, 1928   3 Sheets-Sheet 2

Inventor
Paul Forkardt
by
S. Sokal,
Attorney.

Nov. 17, 1931.    P. FORKARDT    1,832,480
CHUCK
Filed Aug. 22, 1928    3 Sheets-Sheet 3

Patented Nov. 17, 1931

1,832,480

UNITED STATES PATENT OFFICE

PAUL FORKARDT, OF DUSSELDORF-OBERKASSEL, GERMANY

CHUCK

Application filed August 22, 1928, Serial No. 301,316, and in Germany August 22, 1927.

The present invention relates to chucks, and particularly to self-centering chucks of the type in which the adjustment of the jaws is effected by means of bell crank levers. Chucks provided with bell crank levers are known and are very extensively employed for dealing with the mass manufacture of pieces of work of the same dimensions. Apart from mass manufacture, however, many cases arise in practice in which series of pieces of work have to be handled, and such cases necessitate frequent changing of the work pieces on the machine. For such cases the ordinary hand operated three-jaw self centering chucks are at present still employed.

One principal object of the present invention is to render possible the simultaneous self-centering and continuous adjustment of all the jaws to any desired diameter within the range of the chuck, as also to provide means whereby the jaws can be conveniently changed without dismantling the chuck. In this way the field of application of the chuck is very considerably increased. Chucks having bell crank levers are preferably operated by means of compressed air and work automatically. The workman is thus relieved of the laborious task of setting up. The present invention renders it possible to employ an automatic chuck in similar manner to that in which a hand operated universal self-centering chuck was hitherto employed, i. e. to set up even small quantities of work pieces automatically.

According to the invention the bell crank lever together with the pivot pin about which it turns is arranged within a housing which can be pushed out of the chuck body without dismantling the chuck. The end of the long arm of the angle lever is mounted in a rod, which is movable in the direction of the axis of the chuck, in such manner as to be movable in a radial direction. For the purpose of radially adjusting the lever housing, it is arranged so as to engage through the medium of one or more teeth with a ring provided with curved slots which is rotatable on the body of the chuck.

As a result of the arrangement of the pivot pin forming the fulcrum of the lever, in a separate housing, it is rendered possible to locate the said fulcrum much further towards the outside than is the case when the pivot pin is mounted in the chuck body, particularly if the housing is made of a high strength steel. In this way a large leverage and consequently a powerful gripping action is obtained. This is of great importance in the numerous cases in which, owing to the construction of the machine tool or owing to the simultaneous employment of several tools, the chuck diameter must not exceed a certain maximum figure. For a given maximum diameter a maximum gripping effect may be obtained according to the invention. The radial adjustability of the lever housing by means of a slotted ring ensures accurate centering at all times. For the purpose of adjusting the chuck to a different diameter the jaw together with the lever housing may be pushed out of the chuck body without dismantling the chuck. The jaw is then displaced relatively to the lever to the extent of one tooth and both of them are then pushed back into the chuck body. If the aforesaid ring is provided with a spiral thread, the housing will then also be adjustable continuously within wide limits. This continuous adjustment enables the path of the jaw during the gripping operation to be kept as small as possible, in accordance with the margin of error of the pieces of work. At the same time, however, the short arm of the bell crank lever may on the one hand, be made as short as possible in order to increase the leverage, whilst, on the other hand the other hand the travel of the long arm of the said lever may be limited for the purpose of economizing the energy used when the chuck is operated by compressed air.

Various preferred constructional forms according to the invention are illustrated by way of example in the accompanying drawings, in which:—

Figs. 1 and 2 are cross sections of the chuck showing the two limiting positions of the jaws and different positions of the housing, Fig. 3 is an elevation of a ring, as aforesaid, provided with a spiral thread, Fig. 4 is an elevation of a ring provided with curved slots, Fig. 5 is an elevation of the chuck partly in section through one of the lever housings, Figs. 6, 7 and 8 show a constructional form of the chuck according to the invention in which adjustment by means of a slotted or threaded ring is not employed, Fig. 6 shows this latter constructional form in cross section, Fig. 7 in elevation, and Fig. 8 shows the method of connecting the lever housing with the chuck body.

The jaw $b$, which is radially adjustable in the chuck body $a$, is displaced by the bell crank lever $c$ which is adapted to turn about the pivot pin $d$ and is provided with two teeth engaging corresponding recesses on the jaw $b$. The lever $c$ is actuated by the axial displacement of the piston $f$, for instance by means of compressed air. The pivot pin $d$ of the bell crank lever $c$ is mounted in the radially displaceable housing $g$, which is provided on its rear side with teeth. These latter engage with corresponding spirally curved slots $k$ formed in a ring $h$. Alternatively the ring $h$ may be provided with curved projections which engage with corresponding slots in the housing. By turning the ring the housing is radially displaced. The ring is either provided with a spiral thread on its surface, as indicated in Fig. 3, or with a plurality of individual slots or projections respectively, as indicated in Fig. 4. In the constructional form shown in Fig. 4, the housing is only provided with one tooth or one slot respectively. When a ring according to Fig. 3 is employed several turns are given to the ring in order to withdraw the housing from the chuck. In the case of the ring shown in Fig. 4 it is only necessary to turn the ring until the tooth of the housing passes out of the slot $k$, and the housing together with the jaw can then be drawn out of the chuck.

Figure 6:
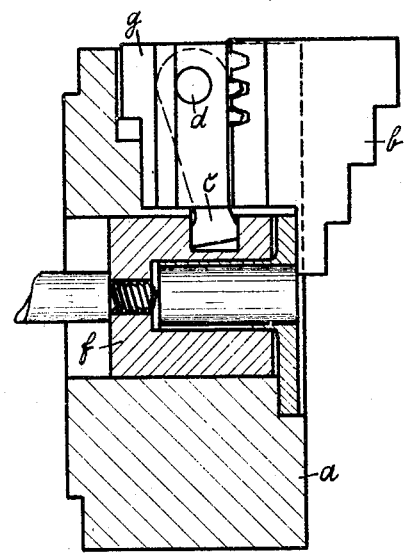
Figure 7:
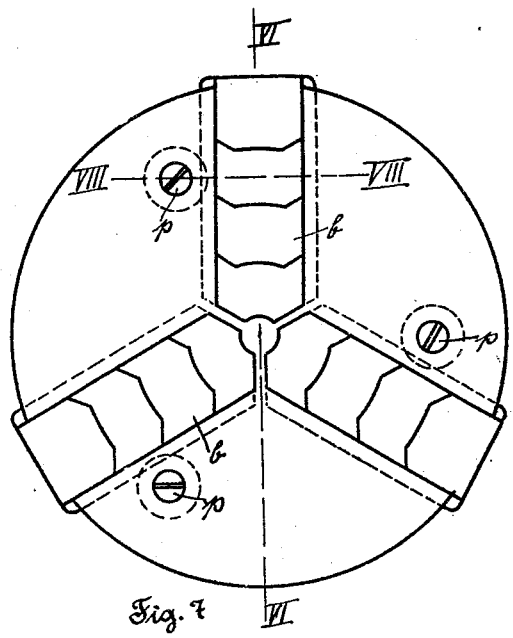
Figure 8:
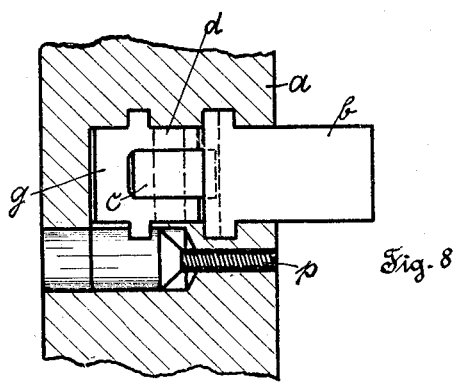

In another constructional form of the invention, illustrated in Figs. 6, 7 and 8, the bell crank lever $c$ serving for operating the jaw $b$ is likewise arranged with its pivot pin $d$ in a housing $g$ adapted to be pushed out of the chuck. In this case, however, the housing $g$ is not radially adjustable. The said housing is held in place in the chuck by means of a removable screw bolt $p$, which engages the housing $g$. After this bolt has been unscrewed, for instance by the aid of a screw driver, the housing can at once be drawn out of the chuck and the jaw $b$ can be exchanged.

Figure 9:
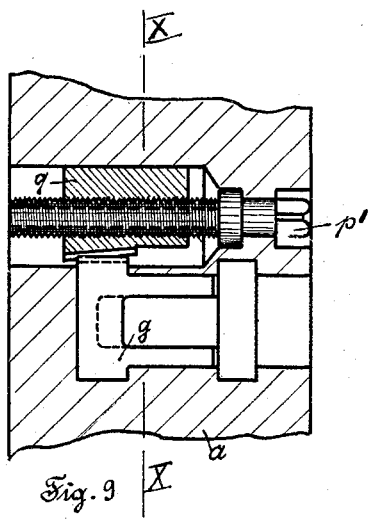
Figs. 9 and 10 show another adjusting device for the jaws.
Figure 10:
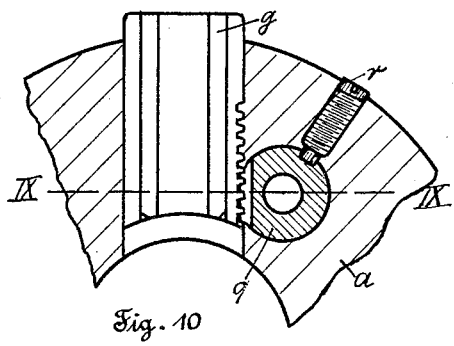

If it is desired to employ the fixing device for the lever housing $g$ as a means for its adjustment also, the device according to Figs. 9 and 10 is built into the chuck. Fig. 9 is a cross section on the line IX—IX of Fig. 10, Fig. 10 is a cross section on line X—X of Fig. 9. A nut $q$ is provided, which engages with a rack arranged laterally on the lever housing and can be brought in and out of engagement therewith by the rotation of a screw bolt $p'$. If it is desired to displace the housing to the extent of one or more teeth, the nut $q$ is brought out of engagement and the housing $g$ is pushed forward the desired distance, whereupon the nut $q$ is again brought into engagement with the teeth of the rack on the housing. The nut is protected against accidental rotation by means of the screw bolt $r$.

Figure 11:
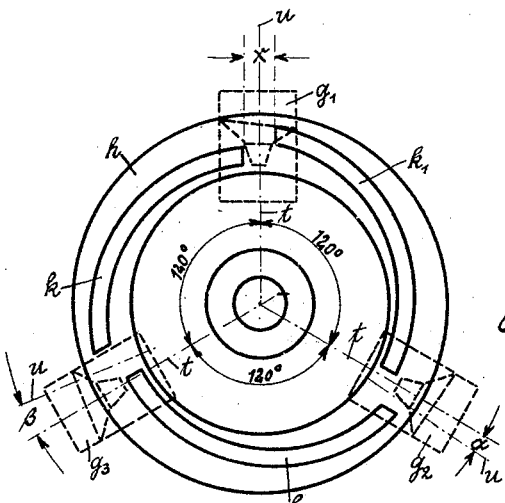
Figs. 11 and 12 show how the three jaws are individually pushed in succession into their respective slots.
Figure 12:
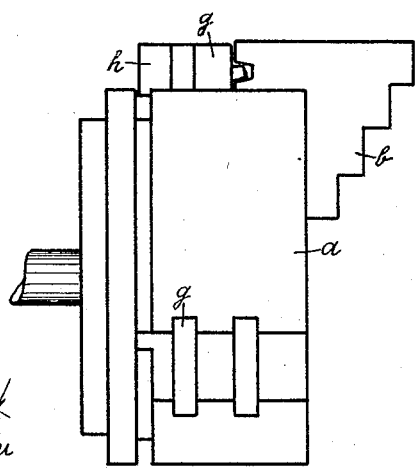

If it were possible, during adjustment of the lever housings $g$ by means of a ring $h$ (for instance, as indicated in Fig. 4), for all three housings to be brought simultaneously out of engagement with the curved guides $k$ of the ring $h$ or to be withdrawn from their slots, as the case may be, the exchanging of the three jaws would be inconvenient for the machine tool operator, inasmuch as it is hardly possible for a single man to perform the necessary operation. For this reason the lever housings are, as may be seen from Figs. 11 and 12, inserted and withdrawn, or brought into and out of engagement with the ring $h$, one after the other. At the moment when the lever housing $g_1$ (see Fig. 11) is pushed into its slot and is just engaging with its curved guide $k$, so that the center of the slot coincides with the center of the space $x$ between the curved guides, the lever housing $g_2$ strikes against the curved guide $k$ so that it is not possible to push it further in, and the center $t$ of the slot forms an angle $\alpha$ with the center $u$ of the space $x$ between the curved guides. At the same time the center $t$ of the slot of the lever housing $g_3$ is located at an angle $\beta$ behind the center $u$ of the distance between the curved guides. In consequence of this the ring $h$ has to be turned a short distance, after the insertion of the lever housing $g_1$, before the lever housing $g_2$ can be completely inserted, and the said ring $h$ must again be turned to the same extent in order that the lever housing $g_3$ may be completely inserted.

I claim:

1. A self-centering chuck, comprising in combination: a chuck body, a housing mounted in said chuck body, a bell crank lever pivoted within said housing, a jaw actuated by said bell crank lever, and means for enabling said housing together with said bell crank lever and its pivot to be removed radially from said chuck body without dismantling the chuck.

2. In a self-centering chuck, the combination of: a chuck body, a housing mounted in said chuck body, a bell crank lever mounted in said housing, a pivot in said housing about which said lever is rotatable, and means for enabling said bell crank lever and said pivot to be slidably removed radially from said chuck body without dismantling the chuck.

3. In a self-centering chuck, the combination of: a chuck body; a housing mounted in said chuck body; a bell crank lever having a long arm and a short arm mounted in said housing; a pivot in said housing about which said lever turns, said lever and said pivot being so arranged as to be slidably removable radially from the chuck body without dismantling the chuck; and a rod member movable in the direction of the axis of the chuck, within which member said long arm is journalled in such manner as to be displaceable radially to the chuck.

4. In a self-centering chuck the combination of: a chuck body; a housing mounted in said chuck body; a bell crank lever mounted in said housing; a pivot in said housing about which said lever is rotatable; said lever and said pivot being so arranged as to be slidably removable from said chuck body without dismantling the chuck; toothed members on said housing, a ring rotatable on said chuck body, and curved guide members on said ring co-operating with said toothed members to effect radial adjustment of said housing.

5. In a self-centering chuck, a combination as specified in claim 4, wherein the said curved guide members are located at unequal distances from one another on said ring.

Signed at Cologne, Germany, this 23rd day of February, 1928.

PAUL FORKARDT.